Patented July 31, 1945

2,380,699

UNITED STATES PATENT OFFICE 2,380,699

MONOALKENYL-SUCCINIC ACID
MONO-ESTER SALTS

Lucas P. Kyrides, Webster Groves, Mo., assignor to Monsanto Chemical Company, St. Louis, Mo., a corporation of Delaware No Drawing. Application March 2, 1942,
Serial No. 432,997

5 Claims. (Cl. 260—485)

The present invention relates to washing, wetting and emulsifying agents which are also known as textile assistants and detergents and refers particularly to new agents of this class. The new agents are derived from alkenyl-substituted polycarboxylic acids resulting from the reaction of unsaturated hydrocarbons or alkyl chlorides with maleic anhydride and similar aliphatic polycarboxylic acids or anhydrides which contain the alpha-beta-enal grouping

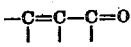

and are salts of partial esters of such alkenyl-substituted polycarboxylic acids.

In my prior copending application, Serial Number 181,597, filed December 24, 1937, which has issued as Patent Number 2,283,214, of which this application is a continuation-in-part, I have disclosed washing, wetting and emulsifying agents which are typified by a water-soluble alkali-metal salt of an alkenyl-substituted acid resulting from the condensation of maleic anhydride with triisobutylene, which acid is called triisobutenyl-succinic acid and may be represented by the formula:

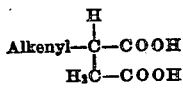

in which "Alkenyl" represents the triisobutylene residue. In said copending application I also disclosed salts of partial esters of such alkenyl-substituted acids which are useful as washing, wetting and emulsifying agents, for example, the sodium salt of the mono-ethyl ester of triisobutenyl-succinic acid, in which one of the carboxyl groups has been esterified by ethyl alcohol and in the other carboxyl group the hydrogen has been replaced by sodium, according to the following formula:

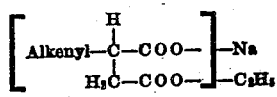

The exact position of the sodium and ethyl group has not been determined, hence the bracketed formula is used to indicate this uncertainty.

In said prior copending application, Serial Number 181,597, I disclosed methods of forming alkenyl-substituted acids by the condensation or reaction of mono-olefins or alkyl halides with unsaturated carboxylic acids containing the alpha-beta-enal grouping. Such unsaturated carboxylic acids which are suitable for the condensation with mono-olefins or alkyl halides are those represented by the formula:

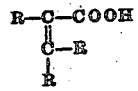

in which R is selected from the group consisting of hydrogen, alkyl and carboxyl radicals. Specific examples of such unsaturated carboxylic acids are fumaric or maleic acid, HOOC—CH=CH—COOH, itaconic acid, CH₂=C(COOH)—CH₂—COOH, citraconic acid, CH₃—C(COOH)=CH—COOH, acrylic acid, CH₂=CH—COOH, and crotonic acid, CH₃—CH=CH—COOH. The alkenyl-substituted acid resulting after the condensation of such acids with a mono-olefin or an alkyl halide has the general formula

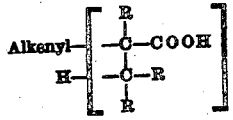

My copending application, Serial Number 430,633, filed February 12, 1942, is directed specifically to the method of reacting alkyl halides with maleic anhydride and similar unsaturated carboxylic acids or anhydrides to obtain such alkenyl-substituted acids and contains additional examples not present in the disclosure of the prior application, Serial Number 181,597.

The present application is directed specifically to salts of partial esters of such alkenyl-substituted acids which are polycarboxylic, that is, contain two or more carboxyl groups. Accordingly, the compounds whose use as washing, wetting and emulsifying agents is contemplated by the present invention, may be represented by the general formula:

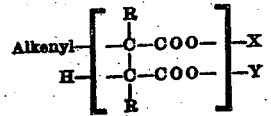

in which X is a metal that will provide a water-soluble salt, such as sodium or other alkali-metal, Y is an alkyl group having less than 17 carbon atoms such as ethyl, propyl, butyl, amyl, hexyl, heptyl, octyl, nonyl, decyl, undecyl, dodecyl, tridecyl, tetradecyl, pentadecyl and hexadecyl radicals, or a radical of an etherified glycol having one free hydroxyl group such as that of the mono-ethyl ether of ethylene glycol $$(-CH_2-O-C_2H_5)$$

or a radical of an etherified glycerol having at least one free hydroxyl group such as that of the diethyl ether of glycerol

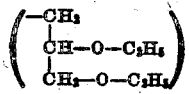

and R is selected from the group consisting of hydrogen, alkyl radicals, metal-substituted carboxyl or carboxylic salt groups (COO—X) and esterified carboxyl groups (COO—Y). The relative positions of the various groups indicated outside the bracket in the above generic formula has not been determined. The compounds may be pure compounds or may be mixtures of all possible substitutions indicated by the bracketed formula. Stated more generally, the compounds specified in the present application are water-soluble salts of partial esters of alkene-substituted polycarboxylic acids resulting from the addition, condensation or reaction of an unsaturated polycarboxylic acid containing the alpha-beta-enal grouping with an olefin or an alkyl halide containing not less than five nor more than sixteen carbon atoms.

A method of making salts of the partial esters of alkenyl-substituted polycarboxylic acids which are contemplated by the present invention comprises first forming the corresponding acid by the reaction of a mono-olefin such as diisobutylene or triisobutylene or an alkyl halide such as dodecyl chloride with an unsaturated polycarboxylic acid containing the alpha-beta-enal grouping according to the processes of my prior applications or as more fully disclosed herein. The alkenyl-substituted acid is then partially esterified and this ester is converted to a water-soluble salt by neutralization with a metal hydroxide or carbonate.

It is preferred, however, in preparing the compounds of the invention, first to make the anhydride of the alkenyl-substituted polycarboxylic acid by condensing the olefin with the anhydride of the unsaturated acid, and thereafter to convert the alkenyl-substituted polycarboxylic acid anhydride to the monoester and neutralize the product to obtain the desired salt of the monoester. This method, which is, of course, only operative with those unsaturated acids that form anhydrides, is illustrated in Example 1 hereinafter.

The compounds of the invention can also be made by condensing an ester of the unsaturated acid, such as the dihexyl ester of maleic acid with triisobutylene or other olefin or alkyl halide, and thereafter partially hydrolyzing or saponifying the resulting diester of the alkenyl-substituted acid, for example, dihexyl ester of triisobutenyl-succinic acid, to obtain the acid or salt of the monoester of the alkenyl-substituted acid, for example, sodium salt of the monohexyl ester of triisobutenyl-succinic acid. This method is illustrated in Example 2.

The unsaturated polycarboxylic acids containing the alpha-beta-enal grouping which are used for the preparation correspond to the following general formula:

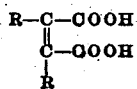

in which R is a hydrogen, alkyl or carboxyl radical. Such acids are, for example, fumaric or maleic acid, HOOC—CH=CH—COOH, citraconic acid, CH$_3$—C(COOH)=CH—COOH, ethylene-tetracarboxylic acid, $$(COOH)_2-C=C-(COOH)_2$$

and the like, or more generally,

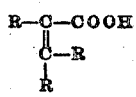

in which the R's have the foregoing significance but of which at least one is a carboxyl group. Thus, itaconic acid, $$CH_2=C(COOH)-CH_2-COOH$$

which does not conform to the previous formula, but which does undergo condensation with olefins, gives an acid conforming most probably to Formula I below (which corresponds to the general formula of the acids from which the compounds of the present invention are derived) rather than Formula II below:

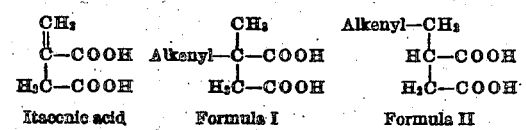

| Itaconic acid | Formula I | Formula II |

The resulting alkene-substituted polycarboxylic acids resulting from condensation of the foregoing unsaturated polycarboxylic acids, will take their names from the corresponding saturated acid. Thus, the alkenyl-substituted acids resulting from condensation with maleic acid or anhydride are alkenyl-succinic acids, whereas those resulting from itaconic or citraconic acids are alkenyl-pyrotartaric acids (methylsuccinic acids).

It is not necessary in my compounds that the two carboxyl groups of the unsaturated polycarboxylic acid or the alkenyl-substituted acid be present on adjacent carbon atoms, as shown in some of the above general formulae. These formulae are merely to be considered as exemplary of preferred species, which include most of the common unsaturated polycarboxylic acids containing the alpha-beta-enal grouping and the alkenyl-substituted polycarboxylic acids resulting therefrom by condensation. More generally, the salts of partial esters whose use is contemplated according to the present invention are those salts of partial esters of acids resulting from condensation or reaction of monoolefins or alkyl chlorides having from five to sixteen carbon atoms, inclusive, with unsaturated polycarboxylic acids containing the alpha-beta-enal grouping.

The alkenyl groups represented in the foregoing formulae are those containing from five to sixteen carbon atoms, inclusive, within which range compounds having the most desirable wetting, washing and emulsifying properties occur. Preferred alkenyl groups are those resulting from polymerized olefins such as diisobutylene, triisobutylene and tetraisobutylene; and triisobutylene is a preferred species.

The salts of partial esters of alkenyl-substituted polycarboxylic acids described herein are comparable in their surface activity to well-known wetting agents and detergents such as the sulfated alcohols and the sulfonated alkyl aromatic hydrocarbons commonly used for this purpose, but many of them do not foam or lather as readily when added to water in the manner that is typical of other wetting agents and detergents. This failure to foam is a definite advantage for certain purposes, and does not detract from their desirability as wetting agents or detergents. They compare favorably with the salts of unesterified alkenyl-substituted carboxylic acids which are specifically claimed in my prior copending application, Serial Number 181,597, and exhibit somewhat faster wetting action. Alkenyl-substituted acids, whether monocarboxylic or polycarboxylic, such as described in my prior copending application, Serial Number 181,597 and herein, when completely esterified so that a solubilizing unesterified carboxyl or metal-substituted carboxyl group, such as COONa, that is capable of yielding positive ions, is absent, lack both solubility and other properties which make for good wetting and detergent action.

In the examples which follow the various alkenyl-substituted polycarboxylic acids or anhydrides of such acids which are specified may be made by the methods described in U. S. Patent No. 2,055,456, or as more particularly described in my prior applications, Serial Numbers 181,597 and 430,633. For the preparation of anhydrides of these alkenyl-substituted polycarboxylic acids the following procedures, exemplified by the preparation of diisobutenyl-succinic and triisobutenyl-succinic anhydrides, may be used:

*Preparation 1.—Triisobutenyl-succinic anhydride*

Into a rotating steel autoclave are charged 330 grams (about 3.37 mols) of maleic anhydride and 600 grams (about 3.56 mols) of triisobutylene (boiling range 173°–175° C.) The autoclave is sealed and agitated and the charge is then heated at 207 to 210° C. (405° to 410° F.) for a period of about 5 hours.

The product is removed from the autoclave and subjected to vacuum distillation. The unreacted maleic anhydride and triisobutylene distill first and they are substantially removed when the distillation conditions reach a temperature of about 125° C. at a pressure of about 185 mm. of mercury. The pressure is then slowly decreased until a pressure of 2 mm. is reached. The distillation is then taken to a temperature of 140° C. at 2 mm. The triisobutenyl-succinic anhydride which remains as the residue may be used without additional purification or it may be purified by further distillation at a higher vacuum, for example, a vacuum of the order of about 1 mm. The distilled product, having a boiling range of about 135° to 145° C. at a pressure of about 1 mm., which is obtained according to this preparation, amounts to about 545 grams, which is about 60% of the yield theoretically possible from the amount of reactants charged to the autoclave.

The distilled product obtained as above described had a neutralization equivalent of 132.1, as determined acidimetrically. The molecular weight of triisobutenyl-succinic acid anhydride is 266, and its theoretical neutralization equivalent is therefore 133. The proportions of reactants used may be varied, as is obvious.

*Preparation 2.—Diisobutenyl-succinic anhydride*

Into a rotating steel autoclave are charged 392 grams (about 4.0 mols) of maleic anhydride and 750 grams (about 6.7 mols) of diisobutylene. The autoclave is sealed and, while it is rotated, it is gradually heated to 207° C. (405° F.) during the course of about 1½ hours and maintained at about that temperature for an additional period of about 2½ hours. The recovery of the product is made by the general method of distillation in vacuum used in Preparation 1.

The boiling range of diisobutenyl-succinic anhydride is approximately 132° to 134° C. at a pressure of 1 mm. of mercury. The yield is about 608 grams of product, which is about 72% of that theoretically obtainable from the charge used. The neutralization equivalent of diisobutenyl-succinic acid anhydride that has been distilled within the range described is 103.0. The molecular weight of diisobutenyl-succinic acid anhydride is 210 and the theoretical neutralization equivalent is therefore 105.

The washing, wetting and emulsifying agents of the invention, which consist of water-soluble metal salts of partial esters of the alkenyl-substituted polycarboxylic acids, may be produced from the alkenyl-substituted polycarboxylic acids or anhydrides according to general procedures illustrated in the examples which follow:

*Example 1.—Sodium salt of mono-n-amyl triisobutenyl-succinate*

Into a flask provided with a stirrer and thermometer are charged 266 grams (about 1 mol) of triisobutenyl-succinic anhydride, prepared, for example, as described in Preparation 1 above, and 88 grams (about 1 mol) of n-amyl alcohol. The charge is heated with stirring to about 100° to 110° C. and maintained at that temperature for a period of about three hours. The resulting product is cooled, any insoluble oil which separates is discarded, and the product is then poured into a solution of 53 grams (½ mol) of anhydrous sodium carbonate (Na₂CO₃) dissolved in 2 liters of water. The product may be recovered as a solid from the solution by drying on a drum-drier.

The foregoing procedure is adaptable generally to the production of all water-soluble metal salts of alkenyl-substituted polycarboxylic acid partial esters from the corresponding alkenyl-substituted polycarboxylic acid anhydrides by substituting the alcohol corresponding to the ester desired. Sodium hydroxide in equivalent amount (40 grams) may be substituted for the sodium carbonate. Potassium carbonate or hydroxide in equivalent amount may be substituted for the sodium carbonate when the potassium salts are the desired products.

*Example 2.—Sodium salt of mono-n-butyl triisobutenyl-succinate*

Into a flask provided with a reflux condenser are charged about 100 grams of triisobutenyl-succinic acid (0.352 mol), 260 grams (3.52 mols) of n-butyl alcohol, and about 1 gram of 100% phosphoric acid. The mixture is heated under gentle reflux for 24 hours and then about 23 grams of distillate are removed at atmospheric pressure. The residue is cooled to room temperature, washed with dilute sodium hydroxide and then washed repeatedly with water until it is neutral. It is dried subsequently by adding benzene thereto and anhydrous sodium sulfate. After drying, the solution is fractionated in a column to get an oil having a boiling point of about 170° to 185° C. at a pressure of 16 to 5 mm. of mercury. The product is a pale yellow oil with green fluorescence and is the dibutyl ester of triisobutenyl-succinic acid.

The foregoing diester is saponified to give the sodium salt of the monobutyl ester of triisobutenyl-succinic acid by heating 39.6 grams (0.1 mol) of the diester with 4 grams (0.1 mol) of sodium hydroxide dissolved in 125 cc. of water and 30 cc. of ethyl alcohol under gentle reflux for several hours. Any unsaponified oil remaining is separated by filtration and the resulting filtrate is made neutral. The resulting salt is recovered by evaporation or other suitable method.

WETTING TESTS

Aqueous solutions of the compounds specified in this invention and related compounds for comparison were prepared for the purpose of making Draves wetting tests according to the procedure outlined in the 1931 and 1932 yearbooks of the American Association of Textile Chemists and Colorists. These solutions were diluted with water to various concentrations (0.25% and 0.125%) and were tested for wetting action by determining the time required for a cotton thread consisting of a 5-gram skein of unbleached cotton made up of 70/2 cotton yarn (70 twists per inch 2-ply yarn folded so as to be immersed in the solution) to be completely immersed in the solution contained in a tall cylinder. In making the test a 1½-gram sinker, which is itself attached to a heavier weight by means of 1 inch of fine thread, is tied to the center of the test thread and the time determined is that which is required for the test thread to sink under the weight of the 1½-gram sinker. The heavier sinker is used so that the test thread is completely in contact with the solution at the start of the test and the time determined is that required for the 1½-gram sinker attached to the test thread to fall to the bottom of the cylinder and pull the test thread with it. The results of such tests are recorded in the following table. The values in the body of the table represent time intervals in seconds.

| Compound | Concentration of solution | |
|---|---|---|
| | 0.25% | 0.125% |
| Diisobutenyl-succinic acid derivatives: | | |
| Sodium salt of mono-n-butyl ester | 12.6 | 143.6 |
| Sodium salt of mono-2-ethylhexyl ester | Inst. | 26.7 |
| Sodium salt of monolauryl (dodecyl) ester | 42.1 | 92.9 |
| Triisobutenyl-succinic acid derivatives: | | |
| Sodium salt (di) | 9.0 | 50.0 |
| Sodium salt of monoethyl ester | 3.4 | 7.5 |
| Sodium salt of monopropyl ester | 3.0 | 8.8 |
| Sodium salt of mono-n-butyl ester | Inst. | 6.8 |
| Sodium salt of mono-n-amyl ester | Inst. | 30.2 |
| Sodium salt of mono-n-hexyl ester | Inst. | 61.1 |
| Sodium salt of mono-2-ethylhexyl ester | 38.0 | 82.9 |
| Dodecenyl-succinic acid derivative: Sodium salt of mono-n-butyl ester | 31 | 24.7 |
| Tetraisobutenyl-succinic acid derivatives: | | |
| Sodium salt of monoethyl ester | Inst. | 20.2 |
| Sodium salt of mono-n-butyl ester | 17.9 | 42.2 |
| Comparison compounds: | | |
| "Santomerse" | 12.9 | 34.9 |
| "Gardinol" | 16.0 | 39.6 |

In the foregoing results it is to be observed that, in the series of sodium salts of the half esters of triisobutenyl-succinic acids, a maximum wetting action is obtained between the ranges of approximately ethyl to hexyl (2 to 6 carbon atoms) and that the octyl has less wetting action than the disodium salt of the acid. In the series consisting of sodium salts of diisobutenyl-succinic acid half esters, the maximum wetting action appears at about the mono-n-octyl ester, while in the series of sodium salts of tetraisobutenyl-succinic acid half esters, the wetting action is at its peak below the sodium salt of the mono-n-butyl ester. Thus, it is apparent that a compound of this series of sodium salts of polyisobutenyl-succinic acid half-esters having a total carbon-atom content of about 16 to 24 carbon atoms, inclusive (including those in the carboxyl groups), and preferably between 18 and 22 carbon atoms, gives the best wetting action.

STANDARD SOIL LAUNDEROMETER TESTS

Standard soil launderometer tests were made with the sodium salt of triisobutenyl-succinic acid and "Santomerse," a commercial detergent consisting of a sodium salt of an alkylated aromatic sulfonic acid, for comparison. The standard soil washing test is conducted as follows: To a cotton fabric is applied under controlled conditions a standard soil solution which is composed of carbon black, vegetable oils and mineral oils in water. The fabric is then aged for a predetermined period. The aging of the fabric is important because the soil is more difficult to remove as it becomes older. The soiled fabric is then washed in a launderometer with a 0.20% aqueous solution of the test detergent and each sample is tested in triplicate at various wash intervals (10, 20, 30 and 40 minutes). The washed sample is then dried and the lightening of the fabric is determined, using a Pulfrich photometer. The relative detergency is then established.

The table illustrates the improvement in whiteness expressed as "per cent baryta white units" obtained with the detergents when used in both hard and soft water.

| | Improvement in Whiteness (percent baryta white units) | |
|---|---|---|
| | "Santomerse" | Sodium salt of triisobutenyl-succinic acid |
| Soft water (50 ppm.): | | |
| 1st wash (10 min.) | 8 | 5 |
| 2nd wash (20 min.) | 15 | 7 |
| 3rd wash (30 min.) | 18 | 9 |
| 4th wash (40 min.) | 21 | 11 |
| Hard water (300 ppm.): | | |
| 1st wash (10 min.) | 13 | 12 |
| 2nd wash (20 min.) | 17 | 18 |
| 3rd wash (30 min.) | 18 | 21 |
| 4th wash (40 min.) | 20 | 24 |

In the following results with the compounds more specifically described in this application the values represent those obtained in the standard soil launderometer test conducted as above, and represent the ratios (in percentages) of soil removal with the test compound to soil removal obtained with "Gardinol," a mixture of the sodium salts of sulfated alcohols consisting of alcohols having from approximately 10 to 16 carbon atoms in the molecule, predominantly those having an even number of carbon atoms. The per cent soil removal is determined by means of a Universal photoelectric photometer instead of a Pulfrich photometer. The results tabulated are the average values of four washings at intervals of 10, 20, 30 and 40 minutes, as before, and 0.20% aqueous solutions of the compounds were used, as before, for the washings.

| Compound | Relative detergency (percent) | |
|---|---|---|
| | Soft water (50 ppm.) | Hard water (300 ppm.) |
| Diisobutenyl-succinic acid derivatives: | | |
| Sodium salt of mono-n-butyl ester | 50 | 83 |
| Sodium salt of mono-2-ethylhexyl ester | 91 | 84 |
| Sodium salt of monolauryl (dodecyl) ester | 118 | 48 |
| Triisobutenyl-succinic acid derivatives: | | |
| Sodium salt of monoethyl ester | 67 | 110 |
| Sodium salt of monopropyl ester | 79 | 94 |
| Sodium salt of mono-n-butyl ester | 86 | 77 |
| Sodium salt of mono-n-amyl ester | 106 | 98 |
| Sodium salt of mono-n-hexyl ester | 125 | 72 |
| Sodium salt of mono-2-ethylhexyl ester | 122 | 62 |
| Dodecenyl-succinic acid derivative: | | |
| Sodium salt of mono-n-butyl ester | 92 | 85 |
| Tetraisobutenyl-succinic acid derivatives: | | |
| Sodium salt of monoethyl ester | 112 | 64 |
| Sodium salt of mono-n-butyl ester | 117 | 61 |
| Comparison compounds: | | |
| "Santomerse" | 100 | 100 |
| "Gardinol" | 100 | 100 |

The sodium salts of the half esters, as can be seen from the values above, are, in general, better detergents in soft water than in hard water, whereas the disodium salt of the unesterified alkenyl-succinic acid is better in hard water than in soft water. It is also to be noted that detergency of the salts of the half esters increases with the length of the ester chain in soft water but decreases in hard water.

The compounds of the invention are of value in the preparation of detergents, polishes, wax and hydrocarbon-oil emulsions, insecticidal emulsions, cold-water paints and as thickening agents for rubber latex, as flotation reagents, as pigment-treating agents to improve dispersibility and grinding properties, as rubber-compounding ingredients and the like. They are of especial value for the preparation of detergents, for which purpose they are equal to or superior to sulfonated detergents such as alkyl aromatic sulfonic acids. The calcium salts of the compounds are soluble in water.

By the term "wetting agent" as used in the specification and claims is to be understood an agent suitable for use as a detergent, emulsifying agent, textile assistant, dispersing agent, etc., or, in general, agents whose properties of reducing surface tension of liquids make them eminently desirable for many applications dependent upon their surface activity.

To the acids and salts of the invention various adjuvants or builders may be added, for example, such materials as sodium carbonate, sodium sulfate, magnesium sulfate, etc., particularly when the products are to be used as detergents.

Inasmuch as the above specification comprises preferred embodiments of the invention it is to be understood that the invention is not limited thereto and that changes and modifications may be made therein without departing substantially from the invention, which is defined in the appended claims.

I claim:

1. The sodium salt of the mono-n-butyl ester of triisobutenyl–succinic acid.

2. An alkali-metal salt of a mono-ester of a mono-alkenyl-succinic acid and an aliphatic alcohol, said ester having a total carbon atom content in the range of 16 to 28, the alcohol radical of said mono-ester having from 2 to 14 carbon atoms, said alkenyl residue having at least 8 carbon atoms.

3. An alkali-metal salt of a mono-ester of a mono-polyisobutenyl-succinic acid and an aliphatic alcohol, said ester having a total carbon atom content in the range of 16 to 28, the alcohol radical of said mono-ester having from 2 to 14 carbon atoms, said polyisobutenyl residue having at least 8 carbon atoms.

4. An alkali-metal salt of a mono-ester of a mono-triisobutenyl-succinic acid and an aliphatic alcohol, the alcohol residue of said mono-ester having from 2 to 12 carbon atoms.

5. An alkali-metal salt of a mono-ester of a mono-diisobutenyl-succinic acid and an aliphatic alcohol, the alcohol residue of said mono-ester having from 4 to 14 carbon atoms.

LUCAS P. KYRIDES.